United States Patent
Osaki

(10) Patent No.: US 11,815,117 B2
(45) Date of Patent: Nov. 14, 2023

(54) WALL THROUGH FIXTURE DEVICE

(71) Applicant: Sugatsune Kogyo Co., Ltd., Tokyo (JP)

(72) Inventor: Masahiro Osaki, Tokyo (JP)

(73) Assignee: Sugatsune Kogyo Co., Ltd., Tokyo (JP)

( * ) Notice: Subject to any disclaimer, the term of this patent is extended or adjusted under 35 U.S.C. 154(b) by 1444 days.

(21) Appl. No.: 16/064,643

(22) PCT Filed: Dec. 16, 2016

(86) PCT No.: PCT/JP2016/087557
§ 371 (c)(1),
(2) Date: Jun. 21, 2018

(87) PCT Pub. No.: WO2017/110679
PCT Pub. Date: Jun. 29, 2017

(65) Prior Publication Data
US 2019/0010971 A1  Jan. 10, 2019

(30) Foreign Application Priority Data
Dec. 21, 2015 (JP) .................................. 2015-248773

(51) Int. Cl.
*F16B 13/08* (2006.01)
*F16B 5/06* (2006.01)
(Continued)

(52) U.S. Cl.
CPC ........ *F16B 13/0833* (2013.01); *A47G 25/065* (2013.01); *F16B 5/06* (2013.01);
(Continued)

(58) Field of Classification Search
CPC .............. F16B 13/0833; F16B 13/0808; F16B 19/109; F16B 13/124; F16B 19/1081;
(Continued)

(56) References Cited

U.S. PATENT DOCUMENTS 2,024,871 A * 12/1935 Parsons ............... F16B 13/0808
411/342
2,132,284 A * 10/1938 Bonham ............. F16B 13/0808
411/342
(Continued)

FOREIGN PATENT DOCUMENTS

DE          4234958 A1    4/1994
DE   202008008435 U1 * 11/2008 .......... F16B 13/0833
(Continued)

OTHER PUBLICATIONS

EPO, Supplementary European Search Report dated Aug. 16, 2019 in EP Patent Application No. 16878568.1, 6 pages.
(Continued)

*Primary Examiner* — Taylor Morris
(74) *Attorney, Agent, or Firm* — Masuvalley & Partners; Peter Martinez

(57) ABSTRACT

A pair of latch members 36R, 36L in a case 20C protrudes from an outer face of the case 20C by a spring 38 and when the case 20C is passed through a wall hole 22H, the latch members 36R, 36L are narrowed by an engagement between outer edge (guiding) slant face 36ROI, 36LOI and a wall hole 22H and after the case 20C has passed through the wall hole 22H, the latch members 36R, 36L are spread by a spring 38 so as to engage the engagement slant faces 36RLI, 36LLI with the wall hole 22H and also while fixing temporarily the case 22C to the wall 22 together with a flange 20FL of the case 22C. After that, a screw 32 is screwed to draw the nut 34 toward the flange 20FL and to engage securely the latch members 36R, 36L held to the nut 34 with the wall hole 22H to complete secure fixing of the case 20C.

8 Claims, 7 Drawing Sheets

(51) Int. Cl.
    *F16B 13/12*     (2006.01)
    *F16B 13/14*     (2006.01)
    *F16B 45/00*     (2006.01)
    *A47G 25/06*     (2006.01)
    *B61D 33/00*     (2006.01)

(52) U.S. Cl.
    CPC ........ *F16B 13/0808* (2013.01); *F16B 13/124* (2013.01); *F16B 13/14* (2013.01); *F16B 45/00* (2013.01); *B61D 33/0007* (2013.01)

(58) Field of Classification Search
    CPC .......... F16B 5/0258; F16B 5/06; F16B 13/14; F16B 45/00; A47G 25/065; B61D 33/0007
    USPC .......................................................... 411/21
    See application file for complete search history.

(56) References Cited

U.S. PATENT DOCUMENTS

| | | | | |
|---|---|---|---|---|
| 2,682,190 A * | 6/1954 | Snyder | ................ | F16B 13/0808 411/346 |
| 2,793,782 A | 5/1957 | Austin | | |
| 3,233,299 A | 2/1966 | Godel | | |
| 3,241,420 A * | 3/1966 | Passer | ................ | F16B 13/0808 411/346 |
| 3,285,118 A * | 11/1966 | Elkins | ................ | F16B 13/0808 411/346 |
| 4,100,833 A * | 7/1978 | Nessa | ................ | F16B 13/0808 411/525 |
| 4,116,104 A * | 9/1978 | Kennedy | ............ | F16B 13/0808 411/342 |
| 4,316,689 A * | 2/1982 | Sanchez Velasco | .. | F16B 13/066 411/60.2 |
| 4,500,239 A * | 2/1985 | Liebig | ................ | F16B 13/0833 411/65 |
| 4,501,520 A * | 2/1985 | Bergner | ............ | F16B 13/0891 411/21 |
| 4,764,065 A * | 8/1988 | Johnson | .................. | F16B 13/08 411/21 |
| 5,147,166 A * | 9/1992 | Harker | ................ | F16B 13/061 411/29 |
| 5,173,025 A * | 12/1992 | Asami | .................. | F16B 37/043 411/21 |
| 5,803,689 A | 9/1998 | Magnus | | |
| 5,991,984 A * | 11/1999 | Schaty | ................ | F16B 13/0808 411/21 |
| 6,062,785 A * | 5/2000 | McDermott | ........ | F16B 13/0808 411/344 |
| 8,132,435 B2 * | 3/2012 | Thomas | .................. | E05B 67/36 411/21 |
| 8,517,650 B2 * | 8/2013 | Niklewicz | ............. | F16B 13/124 411/57.1 |
| 8,529,176 B2 * | 9/2013 | Jutila | .................... | B60P 7/0807 410/116 |
| 8,641,344 B1 * | 2/2014 | Avetisian | ................ | F16B 39/32 411/347 |
| 9,115,744 B1 * | 8/2015 | Bulow | ................ | F16B 19/1036 |
| 9,175,714 B2 * | 11/2015 | Tremmel | ................ | F16B 37/04 |
| 10,378,571 B2 * | 8/2019 | McClure | ............... | F16B 19/109 |
| 10,781,844 B2 * | 9/2020 | Kunken | ............... | F16B 13/0808 |
| 2008/0080948 A1 * | 4/2008 | Barclay De Tolly | ........................ | F16B 13/0808 411/340 |
| 2008/0080949 A1 * | 4/2008 | Deng | .................. | F16B 37/0821 411/342 |
| 2017/0227036 A1 * | 8/2017 | Chapman | .............. | F16B 5/0258 |

FOREIGN PATENT DOCUMENTS

| | | | |
|---|---|---|---|
| EP | 0 104 980 B1 | 7/1986 | |
| EP | 3101326 A1 * | 12/2016 | ............... E04B 2/00 |
| JP | S55-51113 A | 4/1980 | |
| JP | S62-009717 U1 | 1/1987 | |
| JP | H05-2656 Y2 | 1/1993 | |
| JP | H08-168146 A | 6/1996 | |
| JP | 2009-526953 A | 7/2009 | |

OTHER PUBLICATIONS

ISA/JPO, International Search Report dated Jan. 24, 2017 in International Application No. PCT/JP2016/087557, total 4 pages with English translation.

* cited by examiner

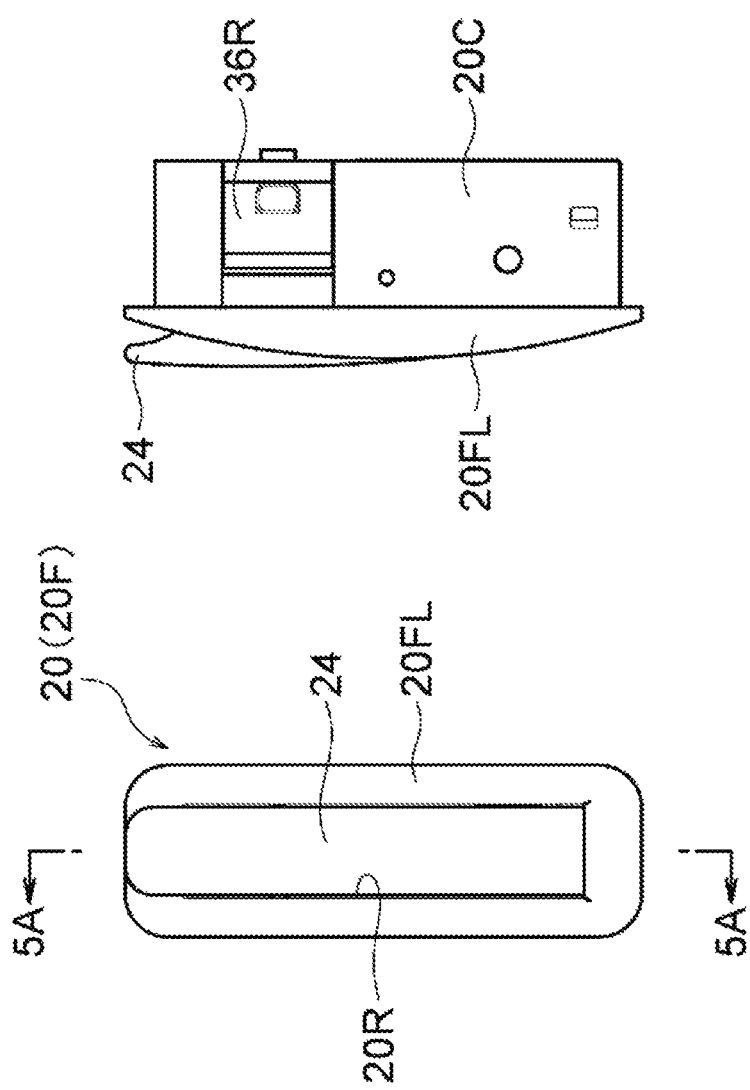

WALL THROUGH FIXTURE DEVICE

RELATED APPLICATIONS

This application is the U.S. National Phase of and claims priority to International Patent Application No. PCT/JP2016/087557, International Filing Date Dec. 16, 2016, which claims benefit of Japanese Patent Application No. 2015-248773 filed Dec. 21, 2015; both of which are incorporated herein by reference in their entireties.

TECHNICAL FIELD

The present invention relates to improvements of a wall through fixture device (or a wall through fixture jig) for fixing various objects such as a hanger or a holding body for holding an optional objects; the hanger may comprise a foldable hook and may be fixed to a rear side of seats of a railway vehicle by inserting a case of the hanger through a wall of the seat.

BACKGROUND ART

Fixture devices (or fixture jigs) for fixing an object to a wall by passing the object through the wall (hereafter merely referred to a fixing device) have been proposed as various forms in which the object is made to pass through the wall and then is fixed to the wall by sandwiching the object with inner and outer faces of the wall (Patent Literatures 1-3).

A fixture device described in Patent Literature 1 (Japanese Utility Model Examined Publication Heisei No. 5-2656) comprises a wall 1 (in Patent Literature 1, referred to a strut 1) and a fastener bolt assembly 6 (in Patent Literature 1, referred to a fastener bolt 6) for passing through holes arranged by placing a wall 1 and an object 4 (in Patent Literature 1, referred to a lateral rail 4), which is to be fixed to the wall 1, such that each of the holes 3, 5 is aligned. The fastener bolt assembly 6 fixes and secures the object 4 by passing the fastener bolt 6 through the holes 3, 5, then screwing a bolt body 7 into a screw part 16 to spread a latch along with a tapered part 12 of the bolt body 7, the latch being held to a backup member 9 (in Patent Literature 1, referred to a sleeve 9 with cutting-in recesses 14) and the backup member 9 being integrated to the screw part 16, further then sandwiching the object 4 between a flange plate 17 at a bolt body 7 side and the hook.

In addition, a fixture device described in Patent Literature 2 (Europe Community Patent No. 0104980B1) comprises a nut 33 retained slidably to an axis line direction with respect to an object 32 to be fixed, a bolt 36 to be screwed into the nut 33 and three wings 2 received within space of the nut 33. When the bolt 36 is screwed into the nut 33, the nut 33 moves toward a head of the bolt 36 along with an axis line direction, and thus a base part of the three wings 2 received in the nut 33 is push by an inner circumference concave part of the object 32 to spread and to protrude from an outer circumference of the object 32 such that t the flange 1 of the object 32 and the spread wings 2 sandwich the object 32 to fix and secure the object 32 to the wall 6.

Furthermore, a fixture device described in Patent Literature 3 (Japanese Translation of PCT Publication No. 2009-526953) comprises holding elements 30, 31 which are held spreadably apart each other by a spring 28 placed in an object 24 to be passed through a wall 18 (in Patent Literature 1, referred to a leg 24). When the object 24 passes through the wall, a screw 44 is screwed into a screw hole 30 of the flange 20 of the object 24; a tip 40 of the screw 44 is sought into concaves 46, 48 of the holding elements 30, 31; then the holding elements 30, 31 are made to be displaced such that the holding elements 30, 31 become closer and to shorten an entire length against a spring 28 so as to make the object 24 pass through the wall 18; and then the screw 44 is loosen to extend apart the holding elements 30, 31 each other by the spring 28 such that the wall 18 is sandwiched between the flange 20 of the object 24 and ends of the holding elements 30, 31 to fix the object 24 to the wall.

However, the prior arts described in Patent Literatures 1 and 2 are both require hand supports of the object so as not to fall down from the wall until the backup member with the hooks (Patent Literature 1: Specification of Japanese Utility Model Examined Publication Heisei No. 5-2656) or the three wings (Patent Literature 2: Europe Community Patent No. 0104980B1) is driven to be displaced for sandwiching the wall at the inside of the wall after an object or a holding body for holding the object passes through the wall. Thus, there were drawbacks in that fixing work became elaborate and workability became low. Furthermore, the prior art literature described in Patent Literature 3: Japanese Translation of PCT Publication No. 2009-526953 holds the object to the wall merely by relative extension of two holding elements and there was a drawback in that the object could not be fixed securely to the wall.

SUMMARY OF INVENTION

A problem which is to be solved by the present invention is to provide a wall through fixture device which may hold temporarily the object until the object to be fixed is made pass through the wall and then parts to be locked to an inner face of the wall are driven to engage such that hand supports of the object may be omitted till the object is fixed securely; excellent workability may be provided and the object may be fixed securely to the wall.

A means for solving problems of the present invention is to provide a wall through fixture device comprising a case with a flange of an object, the flange being engaged with an outer face of a wall, the case being passed through the wall and a wall inner face engagement means held by the case, the wall inner face engagement means being driven so as to engage with an inner face of the wall, thereby fixing securely the object to the wall with sandwiching the wall by the flange of the case and the wall inner face engagement means characterized in that the wall inner face engagement means comprises:

a screw being rotatably supported to the case;

a nut being held non-rotatably in the case and being allowed to move along to a direction becoming near and apart with respect to a face of the wall;

at least one latch member being held displaceably to the nut in a direction along to a face of the wall and being engaged with an inner face of the wall and;

a resilient member for urging the latch member apart from the nut;

wherein the screw is screwed into the nut so as to make the nut and the latch member move toward the inner face of the wall, thereby sandwiching the wall between the flange of the case and the latch member.

According to the means for solving problems of the present invention, between the latch member and a hole of the wall a drawing back means may be preferably disposed and the drawing back means moves so as to draw back the latch member from an outer face of the case by engaging with the hole of the wall for allowing passage through the hole of the wall against the resilient member when the case passes through the hole of the wall.

According to the means for solving problems of the present invention, the drawing back means may consist of an outer peripheral slant face disposed at an outer periphery of the latch member and the outer peripheral slant surface makes the latch member move near to the nut against the resilient member by engaging with an edge of the hole of the wall when the case pass through the hole of the wall.

According to the means for solving problems of the present invention, the case may be preferably comprise a guide disposed in the case for engaging into a guide recess of the nut which allows the nut and the latch member to move slidably along to a direction becoming near and apart to a face of the wall and supports non-rotatably to a rotation direction of the nut.

According to the means for solving problems of the present invention, t the case may preferably comprise a backup tapered face disposed in the case and the backup tapered face backups the latch member such that the latch member engages with the backup tapered face for not coming the latch member near to the nut when the nut and the latch member move toward the flange side of the case in the direction becoming near and apart to a flange side of the case.

According to the means for solving problems of the present invention, the latch member may be preferably supported slidably to a direction along to a face of the wall by a protrusion formed to the nut.

According to the means for solving problems of the present invention, the latch member may be implemented such that the latch member comprises an engagement slant face for locking to an inner edge of the wall hole, and the engagement slant slope allows the latch members to move toward the inner edge of the wall hole together with the nut with respect to screwing of the screw so as to fix the object to the wall together with a flange of the case.

According to the means for solving problems of the present invention, the resilient member may be implemented such that the resilient member has a form of an almost U-shape comprising a spring piece extending along to an inner face of the latch member.

According to the means for solving problems of the present invention, the wall through fixture device may be implemented such that the wall through fixture device further comprises at least one pair of latch members and the pair of latch members is disposed symmetrically at both sides of the nut.

According to the present invention, when an object just passes through a wall, a latch member retained by a nut is drawn back to allow an object to pass through a wall hole and when a flange of the object has passed through to abut to an outer face of the wall, the latch member is spread by force of a resilient member to lock with an inner face of the wall such that the object may not fall down from the wall and may be fixed temporarily to the wall. Thus, if hands become free from the object, the object may not fall down from the wall and thereafter the object may not fall down from the wall until the latch member fixes finally the object by sequential screwing. Therefore, final fixing work by screwing may become easy while secure fixing of the object may be carried out with high workability.

BRIEF DESCRIPTION OF DRAWINGS

FIG. 1A shows a perspective view of a state prior to fixing the hanger hook to the wall and FIG. 1B shows a perspective view of a state after the hanger hook is passed through the wall and is securely fixed.

FIG. 3A shows a perspective view from a rear side and FIG. 3B shows a perspective view from front side.

FIGS. 4A through 4C show an assembled state of a hanger hook having a device according to the present invention. FIGS. 4A through 4C show a front view, a right side view and a rear view, respectively.

FIG. 5A show a 5A-5A cross section of FIG. 4A. FIGS. 5B and 5C show 5B-5B line and 5C-5C line cross sections of FIG. 4C. FIG. 5D shows a cross section under a state in that a pair of latch members is spread; and FIG. 5E shows a cross section under a state in that a pair of latch members is contracted.

FIG. 6A shows a perspective view thereof, FIG. 6B shows a top view thereof and FIG. 6C shows a bottom view thereof.

FIGS. 7A through 7D show a state prior to insertion of the object, a state under the insertion, and a securely fixed state after the insertion and a vertical cross section of a securely fixed state to a thin wall, respectively.

Now, embodiments of the present invention will be detailed with referring to drawings. FIGS. 1A and 1B show an object 20 having a wall through fixture device 10 of the present invention is to be a hanger hook 20, F and FIG. 1A shows a state prior to fixing the hanger hook 20F to the wall 22 and FIG. 1B shows a state after the hanger hook 20F is passed through a wall hole 22H of the wall 22 and fixed thereto. In the descriptions hereunder, the hanger hook 20F will be merely referred to the object 20.

Figure 1:
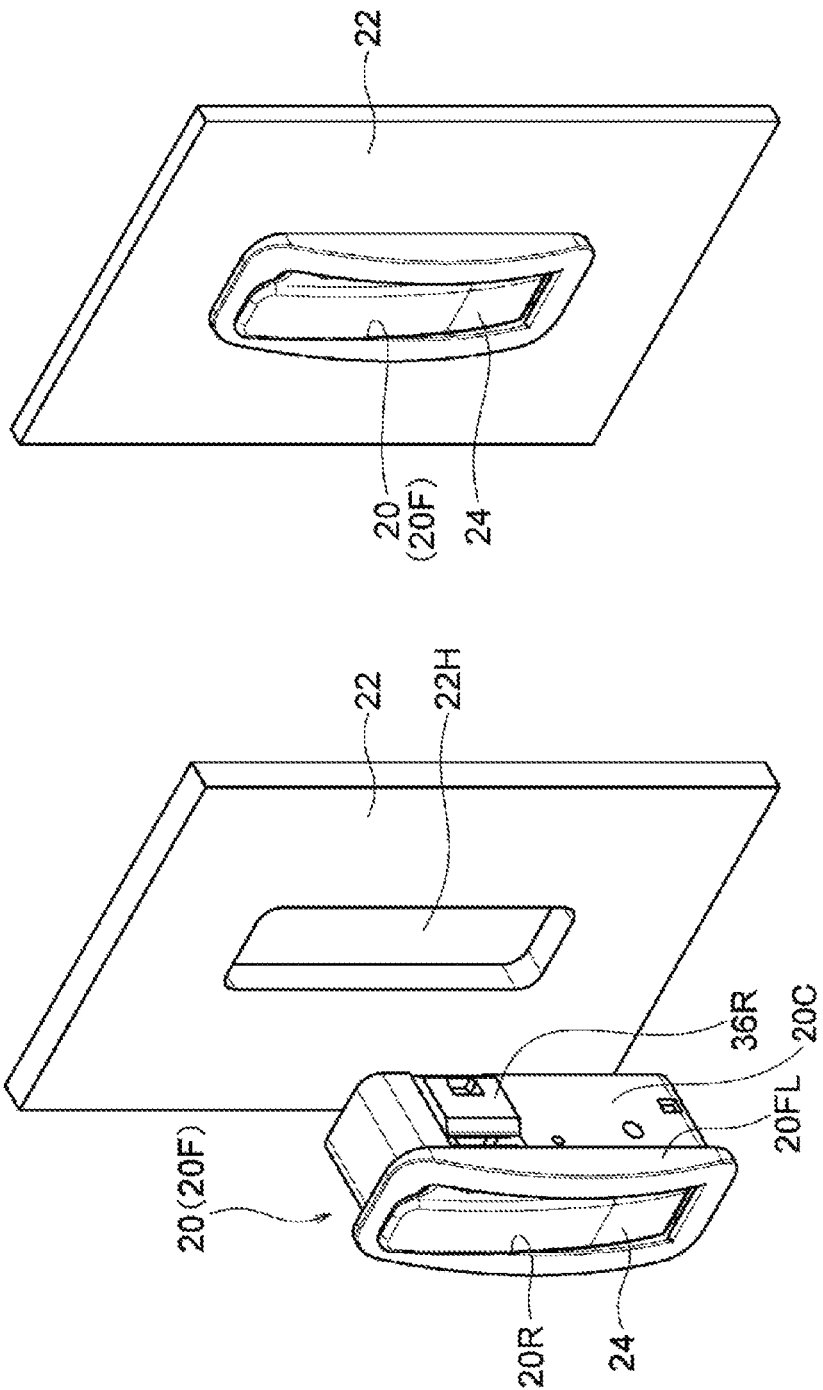
FIGS. 1A and 1B show a hanger hook (object) according to the present invention having a wall through fixture device.

The wall through fixture device 10 of the present invention, as shown from FIG. 1A to FIG. 3B, may be constructed by the object 20 itself which is passed through the wall or may be constructed from a case 20C having a flange 20FL which is to be engaged with an outer face of the wall 22 and a wall inner face engagement means 30 (refer to FIG. 3A) hold by the case 20C while being driven to engage with the inner face of the wall 22. The wall through fixture device 10 of the present invention securely fix the object 20 to the wall 22, under the condition that the case 20C has passed through the wall 22, by fastening and sandwiching the flange 20FL of the case 20C and an engagement part of the wall inner face engagement means 30 with outer and inner faces of the wall 22. In the embodiment shown in the figure, the case 20C is one section of the object itself 20 and also is to be a case of the hanger hook 20F, but not limited thereto, the case 20C may be a case of a holding body for holding any object.

Figure 2:
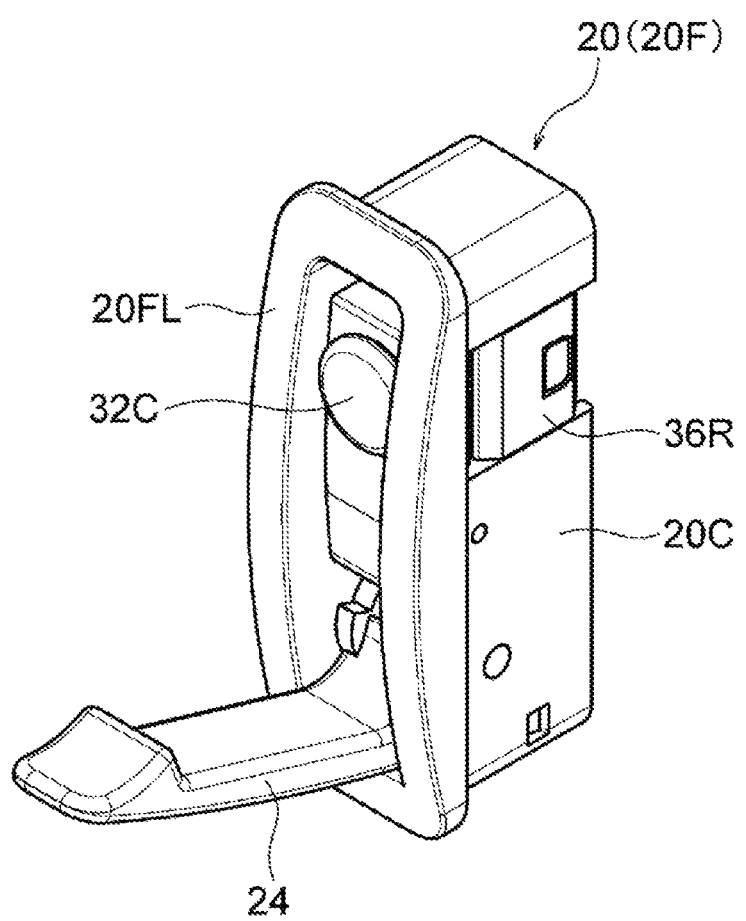
FIG. 2 shows a perspective view of a hanger hook (object) prior to fixing to a wall and the hook is under its used state is shown.
Figure 5A:
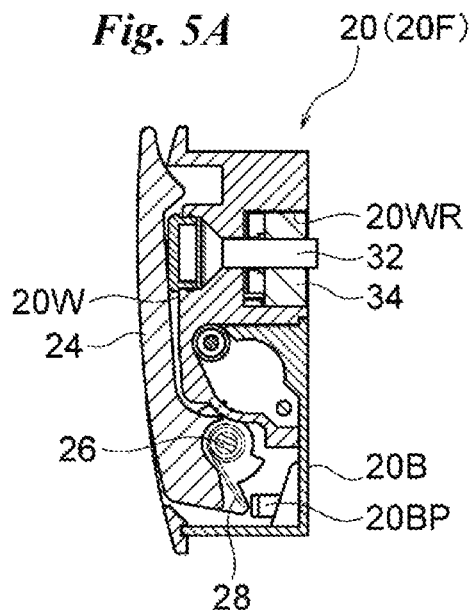
FIGS. 5A through 5E show a cross section of a hanger hook of FIG. 4A.
Figure 5B:
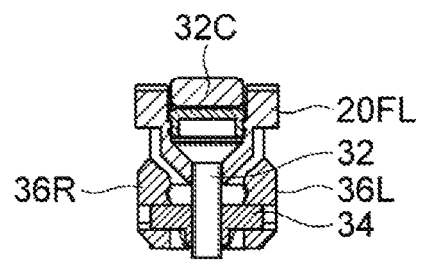
Figure 5C:
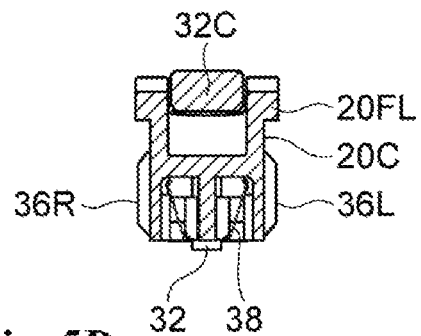
Figure 5D:
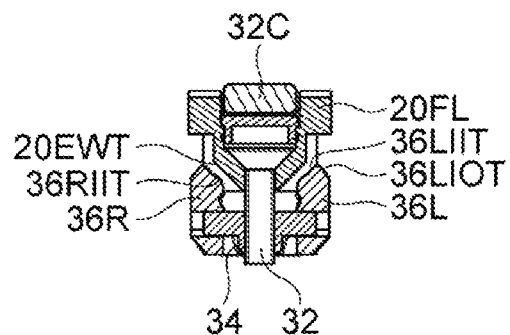
Figure 5E:
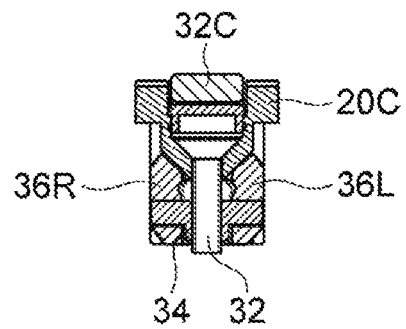
Figure 6A:
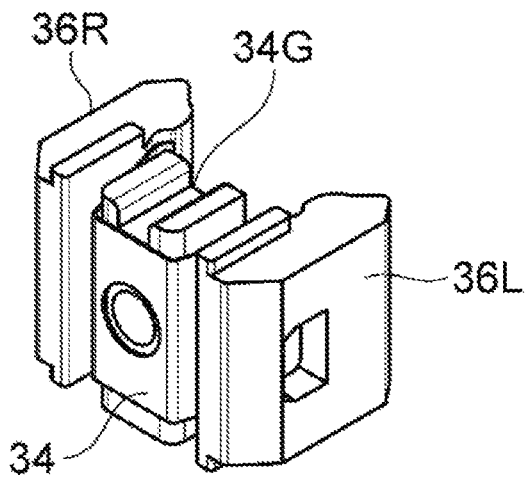
FIGS. 6A through 6C show a relation between a pair of latch members and a spring.
Figure 6B:
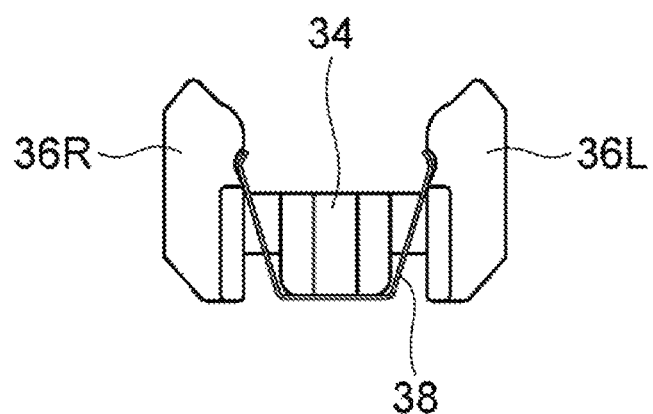
Figure 6C:
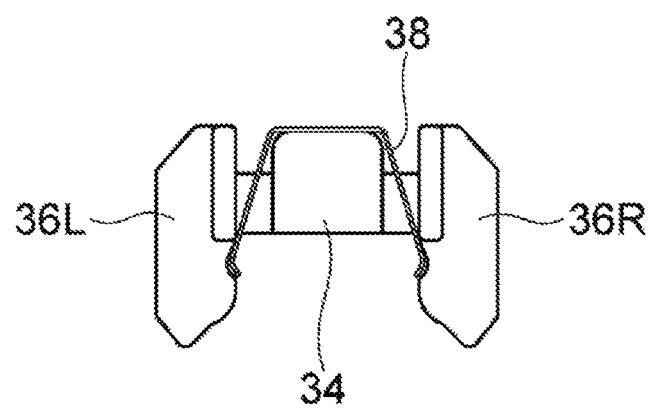

The hanger hook 20F comprises a hook member 24 receivable within a front recess 20R of the case 20C and the hook member 24 is supported pivotally with a pin 26 extending through walls of both sides of the case 20C (refer to FIG. 5A). To the pivot region, a return spring 28 is disposed and the hook member 24 may be supported such that the hook member 24 may be received normally in the recess 20R of the case 20C. Here, to this pivot moving region, a dumper (not shown) is disposed and the dumper restrains sudden return of the hook member 24 when the thing is removed from the state in that the hook member 24 is opened as shown in FIG. 2 and an optional thing is hanged on the hook member 24.

The wall inner face engagement means 30 used in the present invention comprises, as shown in FIGS. 3A-3B and FIGS. 5A through 5E, a screw 32 rotatably supported to a plane wall 20W (refer to FIG. 5A) disposed at the bottom of the recess 20R of the case 20, a nut 34 hold non-rotatably to the recess 20WR at the rear side of the wall face 20W (refer to FIG. 5A), which is allowed to move to a first direction (A direction in FIGS. 3A and 3B) coming near and apart with respect to the wall face 20W of the case 20C, a pair of latch members 36R,36L (refer to FIGS. 5B through 5E) which is disposed and held symmetrically at both sides of the nut 34 and is displaceable slidably with respect to a second direction (B direction in FIGS. 3A and 3B) extending along to the wall face of the plane wall 22W so as to engage with an inner face of the wall 22, and a resilient member 38 (refer to FIG. 5C and FIGS. 6A through 6C) which is disposed inside the pair of latch member 36R, 36L for urging the pair of latch members 36R, 36L to spread apart each other.

Figure 3A:
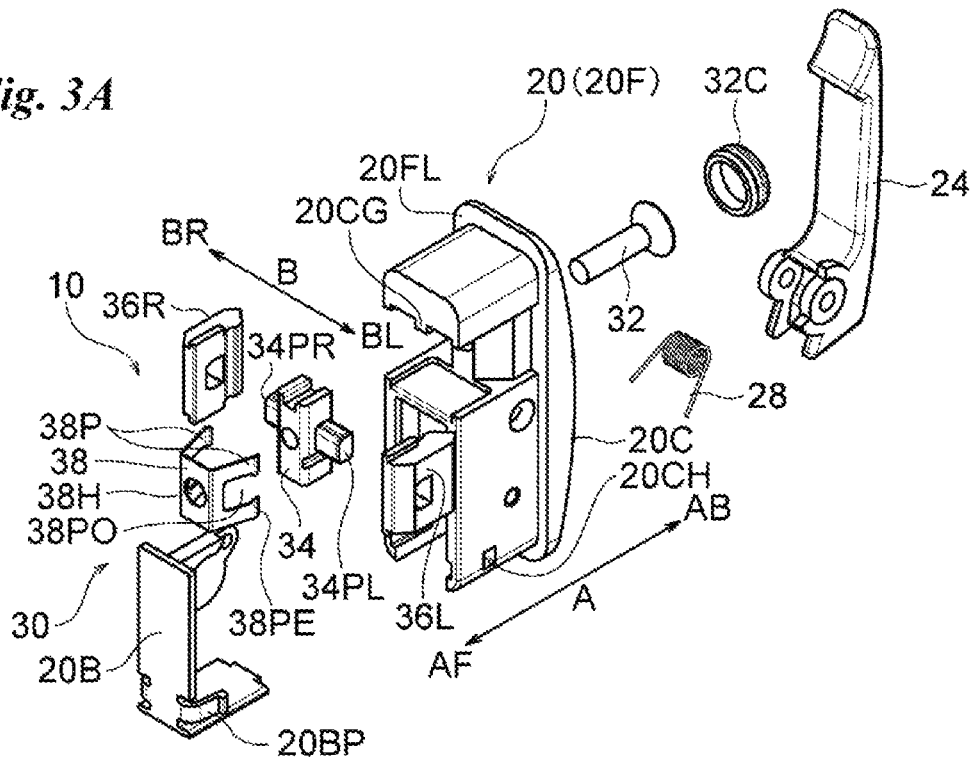
FIGS. 3A and 3B show an exploded state of a hanger hook having the device according to the present invention.
Figure 3B:
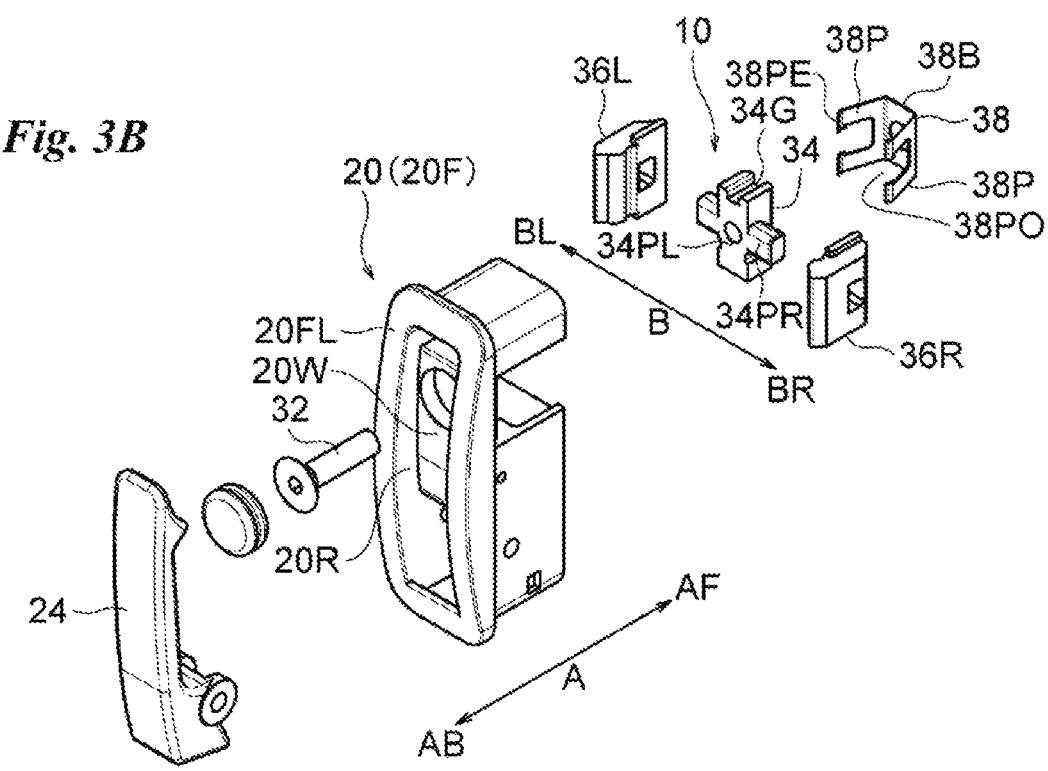

In the embodiment shown in the figure, the nut 34 has, as shown in FIGS. 3A and 3B, a crosswise shape and the pair of latch members 36R, 36L is held slidably to protrusions 34PR, 34PL extending both sides of the cross-shape such that the pair of latch members 36R, 36L may move along to the direction of an arrow BR, BL so as to come near and apart each other with respect to the protrusions 34PR, 34PL of the nut 34.

The resilient member 38 comprises, as shown in FIGS. 3A and 3B and FIGS. 5A through 5E, a base part 38B engaging with the rear face of the nut 34 and a pair of spring pieces 38P extending from the base part 38B. The resilient member 38 has a generally U-shaped form such that the spring pieces 38P engage with the inside of the pair of latch members 36R, 36L and urge the pair of the latch members 36R, 36L to the direction being apart each other so as to make the pair of latch members 36R, 36L projects from the both sides of the case 20C. The spring piece 38P of the spring 38 comprises, as shown in FIGS. 3A and 3B, an aperture 38PO which allows to escape from the protrusion 34PR, 34PL and is located between the body of the nut 34 and the pair of latch members 36R, 36L and also comprises an aperture 38H into which a tip of the screw 32 is engaged. Here, the resilient member 38 may not fall off from the nut 34 with a folded end 38PE engaging with the protrusion 34PL of the nut 34 at tips of the pair of spring pieces 38P.

In the embodiment shown in the figure, the case 20C comprises a guide 20CG disposed inside the case 20C for supporting slidably the nut 34 and the pair of latch members 36R, 36L to the first direction while supporting non-rotatably to a rotation direction of the nut 34 (refer to FIG. 3A). This guide 20CG engages with a guide recess 34G disposed at an inward edge of the nut 34 (refer to FIG. 3B) and guides the nut 34 and the pair of the latch members 36R, 36L to move toward the first direction.

Figure 7A:
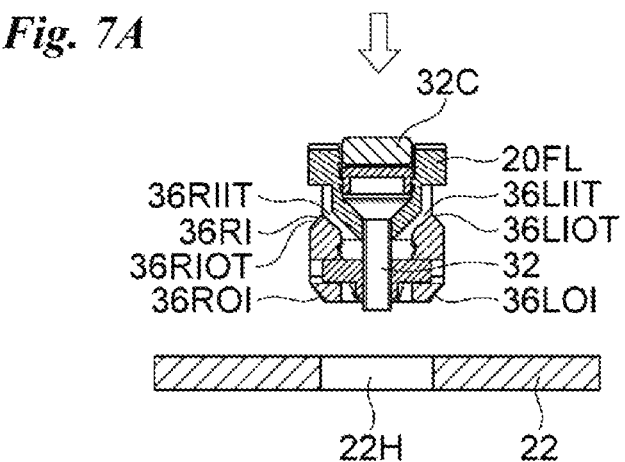
FIGS. 7A through 7D show a state fixing a hanger hook (object) having a device according to the present invention.
Figure 7B:
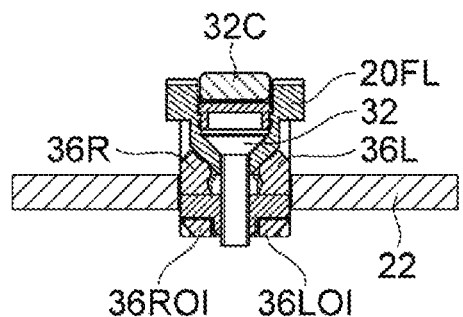

The pair of the latch members 36R, 36L comprises outer periphery (guiding) slant faces 36ROI, 36LOI (refer to FIG. 7A) which guide, when the object 20 passes through the hole 22H of the wall 22, the passage thereof by engaging with an inner face of the wall hole 22H while being displaced to become narrow against the spring 38.

Here, motion of the wall through fixture device 10 for the object according to the present invention will be described. The pair of latch members 36R, 36L is held such that they normally project apart each other from both sides of the case 20 by the spring piece 38P of the resilient member 38 (in the width almost same as the flange 20FL of the case 20C) (refer to FIGS. 5B through 5D and FIG. 7A). Spacing of outer faces of the pair of latch members 36R, 36L is wider than an inner face width of the wall hole 22H (refer to FIG. 7A), when the object 20 is just inserted into the wall hole 22H, the pair of latch members 36R, 36L are displaced with becoming narrow along to the outer slant faces 36ROI, 36ROI of the pair of latch members 36R, 36L so as to be drawn back from an outer face of the case 20 so that the object 20 may be allowed to pass through the wall hole 22H.

When the flange 20FL of the object 20 has passed through the wall hole 22H to abut an outer face of the wall 22 and the pair of latch members 36R, 36L has passed through the wall hole 22H, the pair of latch members 36R, 36L is displaced to spread apart each other by the resilient member 38. Therefore, the inner edges 36RI, 36LI of the pair of latch members 36R, 36L abuts to the inner face of the wall 22 so that the pair of latch members 36R, 36L may not be fallen out and furthermore, the object 20 may be fixed temporarily by sandwiching the wall 22 between the flange 22FL thereof and the inner edges 36RI, 36RL of the pair of latch members 36R, 36L.

Further described in detail, as understood from FIGS. 5A through 5E and FIGS. 7A through 7D, the outer faces of the inner edges 36RI, 36LI of the pair of latch members 36R, 36L have the engagement slant faces 36RIOT, 36LIOT and the pair of latch members 36R, 36L is fixed temporarily by engaging these tapered faces 36RIOT, 36LIOT with an under edge of the wall hole 22H. Then, the screw 32 is screwed into the nut 34 and the pair of latch members 36R, 36L is displaced toward the wall 22 in the first direction so as to be drawn toward the inner face of the wall 22. Then the wall 22 is sandwiched between the flange 20FL of the case 20C and the pair of latch members 36R, 36L more strongly to fix finally the object to the wall (refer to FIG. 7C).

For further ensuring the final fixing of the object by the pair of latch members 36R, 36L, the pair of latch members 36R, 36L as shown in FIGS. 5A through 5E and FIGS. 7A through 7D, comprises backup tapered faces 36RIIT, 36LIIT at counter faces of the inner edges, and furthermore comprises backup tapered faces 20EWT (refer to FIG. 5D) at the back face of the plane wall 20W of the case 20C to which these backup tapered face 36RIIT, 36LIIT abut. Thus, as the pair of latch members 36R, 36L comes nearer and nearer to the wall 22 due to screwing of the screw 32 into the nut 34, sandwiching force of the pair of latch members 36R, 36L may not be weakened even if the pair of latch members 36R, 36L is push by the face of the wall hole 22 so that the final fixing of the object 20 may be securely completed.

As described above, according to the device 10 of the present invention, as the object 20 just passes through the wall hole 22, the pair of latch members 36R, 36L held to the nut 34 is narrowed to allow passage through the wall hole 22H. When the object 20 has passed through to make the flange 20FL of the object 20 abut to the outer face of the wall 22, the pair of latch members 36R, 36L is spread by the force of the spring 38 to lock with the inner face of the wall 22 and the object 20 is fixed temporarily to the wall. Therefore, the object 20 may not fall down from the wall 22 if hands are free from the object 20 such that the object 20 may not fall down until the pair of latch members 36R, 36L is fixed finally by subsequent screwing the screw 32 and the final fixing by subsequent screwing of the screw 32 may become easy.

Figure 7C:
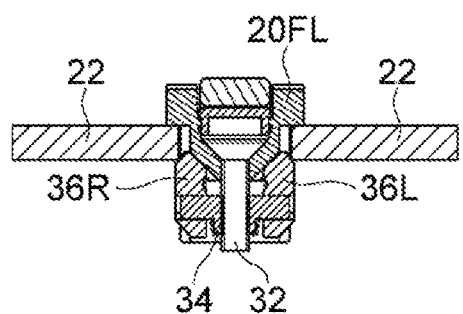
Figure 7D:
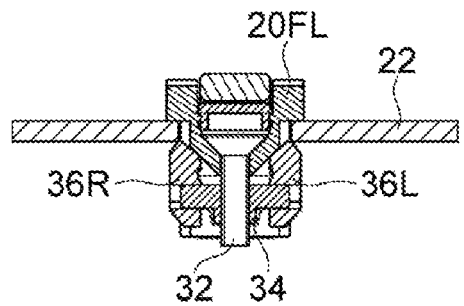

As understood by comparing FIG. 7C and FIG. 7D, when a thickness of the wall 22 is large, a screwing depth of the screw 32 under the final fixing state is shallow, however, when the thickness of the wall 22 is small, the screwing depth of the screw 32 under the final fixing state becomes deep.

Here, in FIG. 3A, a sign 20B represents a back cover of the case 20 and the back cover 20B is fixed to a body of the case 20C by engaging an engagement fin 20BP with an engagement hole 20CH of the body of the case 20. Furthermore, in FIGS. 2, 3A, 3B, 5A-5E, and 7A-7D, a sign 32C represents a cap to be covered onto a head of the screw 32.

In the above embodiment, the object 20 is integrated as the case 20C of the device 10. The case 20C may be fixed to the wall 22, in which the object itself separately prepared from the case 20C is retained and is fixed to the case 20C by an adequate means. Furthermore, although the pair of latch members 36R, 36L is narrowed by the outer periphery (guiding) slant face 36ROI, 36LOI, the guiding slant face may be disposed at an outer periphery side of the wall hole 22H rather than the pair of latch members 36R, 36L sides. Alternatively, without providing the slant face, the pair of latch members 36R, 36L may be narrowed by fingers to insert the case 20C into the wall hole 22H.

Now, in the above embodiment, the pair of latch members 36R, 36L are provided, however, one latch member may be used so far as the case 20C may be assembled without slanting when sandwiched by the flange 20FL and one latch member, or alternatively, the wall 22 may be sandwiched by the flange 20 FL and two pairs of the latch members.

Furthermore, in the above embodiment, the terms "outer face, inner face" of the wall 22 and "outer periphery, inner periphery" of the pair of latch members 36R, 36L are used. In these terms, the meanings of "inner" or "outer" should be understood as; the term "outer" means the far side and the term "inner" means the near side along to the direction for insertion of the case 20C. Therefore, when the wall 22 is a part of a large casing and the insertion of the case 20C is performed from the inside of the casing, the wall face at the inside of the casing should be understood as the outer face and the wall face at the outside of the casing should be understood as the inner face.

Furthermore, in the embodiment, the case 22C has passed through the wall hole 22H and the flange 20FL and the pair of latch members 36R, 36L sandwich the wall 22; however, an object to be fixed may be formed on the outer face or the inner face and a wall of the object to be fixed having the hole which is aligned to the hole 22H of the wall 22 may be overlapped, and then case 22C may be passed through holes of these walls such that these walls may be sandwiched by the flange 20FL and the pair of latch members 36R, 36L of the case 22C so as to fix the object to be fixed. In this case, an assembled body of the case 22C, the nut 34 and the pair of latch members 36R, 36L may be referred to a fixture jig rather than referred to a fixture device.

When the case of the object to be fixed is passed through the wall hole, the case may be passed through the wall hole by drawing back the latch members against the resilient member which are disposed in the case and protrude from the outer face by the spring. When the passing through proceeds such that the flange of the case abuts to the outer face of the wall, the latch members spread by the force of the resilient member to engage with the inner face of the wall to fix the object temporarily so that the object may not fall down from the wall when hands are free from the object, and furthermore, the object may not fall off until the latch members 36R, 36L come proximity to the wall face and is fixed finally by subsequent screwing of the screw and then, the final fixing by screwing of the screw may become easy and the secure fixing of the object may be performed efficiently so that high industrial applicability may be provided.

DESCRIPTION OF SIGNS NA NUMERALS 10 wall through fixture device
20 object
20F hanger hook
22 wall
22H wall hole
20C case
20CH engagement hole
20BP engagement piece
20W plane wall
20WR recess
20FL flange
20R recess
20GC guide
20EWT tapered face
24 latch member
26 pin
28 return spring
30 wall inner face engagement means
32 screw
34 nut
34PR, 34PL protrusion
34G guide recess
36R, 36L a pair of latch members
36RLI, 36LLI inner periphery slant face
36ROI, 36LOI outer periphery (guiding) slant face
36RI, 36LI inner edge
36RIIT, 36LIIT tapered face
38 resilient member
38B base part
38PE folding end

The invention claimed is:

1. A wall through fixture device comprising a case with a flange of an object, the flange being engaged with an outer face of a wall, the case being passed through the wall and a wall inner face engagement means held by the case, the wall inner face engagement means being driven so as to engage with an inner face of the wall, thereby fixing securely the object to the wall with sandwiching the wall by the flange of the case and the wall inner face engagement means characterized in that the wall inner face engagement means comprises:
   a screw being rotatably supported to the case;
   a nut being held non-rotatably in the case and being allowed to move toward and away from a face of the wall;
   at least one latch member being formed separately from the nut and held displaceably to the nut in a direction along to a face of the wall and being engaged with an inner face of the wall and;
   a resilient member for urging the latch member apart from the nut;
   wherein the latch member is supported slidably by a protrusion formed on the nut while maintaining a posture such that the latch member is able to slide along a length of the protrusion in a direction along the face of the wall, the screw is screwed into the nut so as to make the nut and the latch member move toward the inner face of the wall, thereby sandwiching the wall between the flange of the case and the latch member.

2. The wall through fixture device of claim 1, wherein between the latch member and a hole of the wall a drawing back means is disposed and the drawing back means moves so as to draw back the latch member from an outer face of the case by engaging with the hole of the wall for allowing passage through the hole of the wall against the resilient member when the case passes through the hole of the wall.

3. The wall through fixture device of any one of claim 2, wherein the drawing back means consists of an outer peripheral slant face disposed at an outer periphery of the latch member and the outer peripheral slant face makes the latch member move near to the nut against the resilient member by engaging with an edge of the hole of the wall when the case passes through the hole of the wall.

4. The wall through fixture device of claim 1, wherein the case comprises a guide disposed in the case for engaging into a guide recess of the nut, the guide allows the nut and the latch member to move slidably toward and away from a face of the wall and non-rotatably supports the nut and the latch member to a rotation direction of the nut.

5. The wall through fixture device of claim 1, wherein the case comprises a backup tapered face disposed in the case and the backup tapered face backups the latch member such that the latch member engages with the backup tapered face so as to prevent the latch member from nearing the nut when the nut and the latch member move toward a flange side of the case.

6. The wall through fixture device of claim 1, wherein the latch members comprises an engagement slant face for locking to an inner edge of the hole of the wall, and the engagement slant face allows the latch members to move toward the inner edge of the hole of the wall together with the nut with respect to screwing of the screw so as to fix the object to the wall together with a flange of the case.

7. The wall through fixture device of claim 1, wherein the resilient member has a form of a U-shape comprising a spring piece extending along to an inner face of the latch member.

8. The wall through fixture device of claim 1, wherein the wall through fixture device further comprises at least one pair of latch members and the pair of latch members are disposed symmetrically at both sides of the nut.

\* \* \* \* \*